Oct. 7, 1952  R. P. ROETTER  2,612,870
PNEUMATIC CONTROL APPARATUS
Filed Oct. 1, 1949  2 SHEETS—SHEET 2

Inventor
ROBERT P. ROETTER
By George H Fisher
Attorney

Patented Oct. 7, 1952

2,612,870

UNITED STATES PATENT OFFICE 2,612,870

PNEUMATIC CONTROL APPARATUS

Robert P. Roetter, Gary, Ind., assignor to Minneapolis-Honeywell Regulator Company, Minneapolis, Minn., a corporation of Delaware Application October 1, 1949, Serial No. 119,175

8 Claims. (Cl. 121—41)

The present invention relates to an improved pneumatic reset relay.

In the control art it is well known that great difficulty is experienced in obtaining both high accuracy and stability in a control system. Two-position and floating type control systems frequently tend to cycle or hunt badly and when stability is obtained by using a proportioning type system, the unavoidable offset lessens the accuracy of control. These difficulties have been overcome in industrial control work by reset relays which operate to superimpose a delayed floating type control action on proportional control action, Reissue Patent 21,804 to Harvard H. Gorrie being an example of this sort of relay. With this apparatus, the initial response to a deviation in the controlled variable causes a proportional type control action accompanied by the inevitable offset. Subsequently, the rebalancing force characteristic of proportioning control is gradually balanced out, thus causing the control apparatus to function as a floating system with a resulting minimizing of the previous offset, stability meanwhile being maintained by the slow shift from one sort of control to the other. However, apparatus such as that of Re. 21,804 has been too costly, cumbersome and complicated to meet most requirements, especially in the field of comfort air conditioning and heating.

It is therefore a major object of the present invention to provide an improved and simplified pneumatic reset relay.

It is a further object to provide a pneumatic reset relay adapted for mass production yet which is highly sensitive and accurate in use.

It is an additional object to provide a pneumatic reset relay having only a single adjustment which is easily made and positive in operation.

It is also an object to provide a pneumatic reset relay which is so small and compact that it may be installed where most convenient such as the wall of a home or office.

It is a further object to provide a pneumatic reset relay which is effective to remove most of the offset of a proportional control system and which further exerts a stabilizing influence.

It is another object to provide a device of the class described which uses a maximum of conventional and readily obtainable components, thereby resulting in lower cost of production.

These and other objects will become apparent upon a study of the following specification and drawings wherein.

Figure 1:
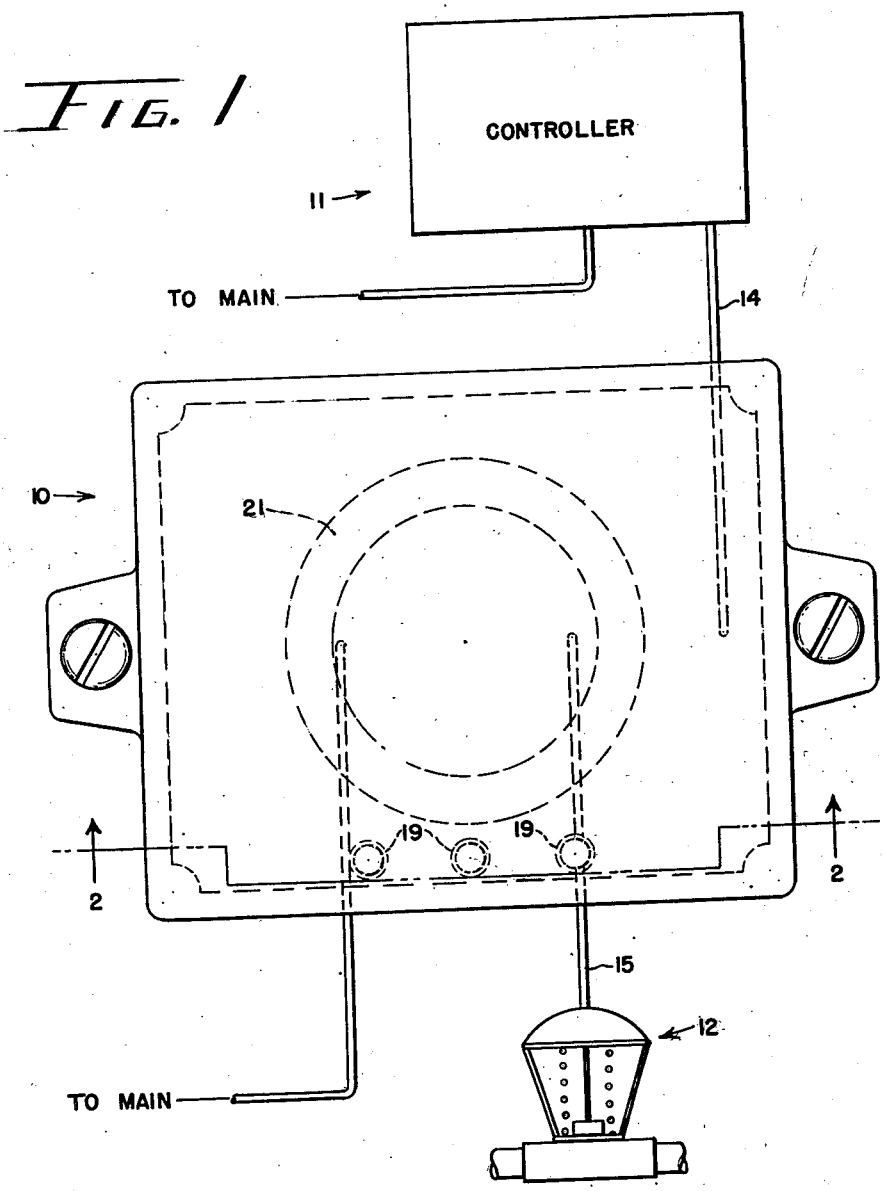
Figure 1 is a schematic view of a system incorporating the present relay.

In Figure 1, reset relay 10 is interposed between a proportioning controller 11, such as a thermostat, and a pneumatic motor valve 12, said valve, for instance, controlling the flow of steam to a radiator, not shown, in the room in which thermostat 11 is located. If this apparatus was arranged in the usual manner by leaving out relay 10 and connecting branch pipe 14 of thermostat 11 to pipe 15 running to motor valve 12, then an ordinary proportioning system would result, with the position of the valve being dependent upon the temperature in thermostat 11 and requiring a temperature change equal to the throttling range of the controller to cause operation of valve 12 from one extreme position to another extreme position. This sort of system is satisfactory where the throttling range of the controller is small enough to maintain the accuracy of control desired, but, generally, attempts to reduce the throttling range of a controller results in unstable or hunting conditions. For the reasons explained in the aforementioned Gorrie Re. 21,804 patent, both a reasonably wide throttling range for the controller and a relatively close ultimate control can be realized by using reset relay 10.

Figure 2:
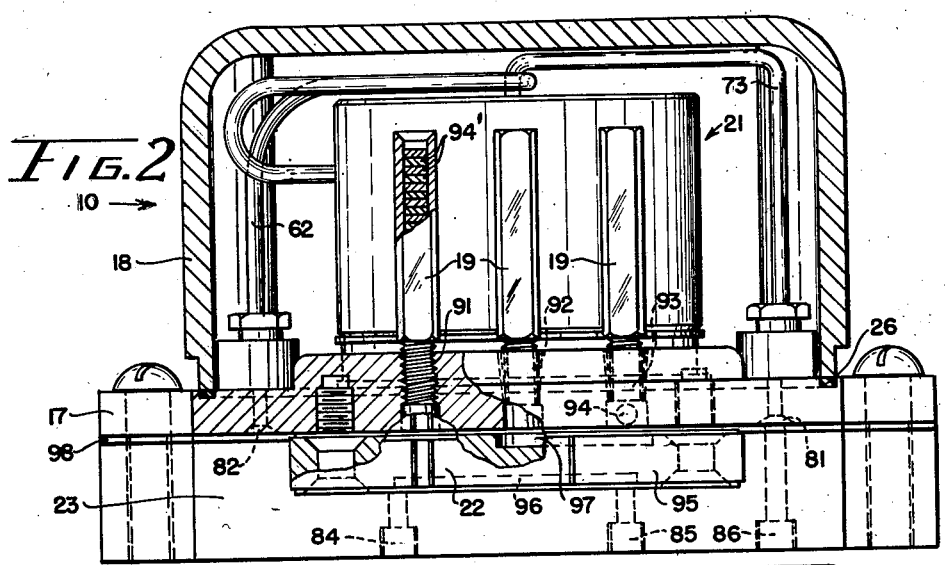
Figure 2 is a sectional view taken on the line 2—2 of Figure 1.
Figure 3:
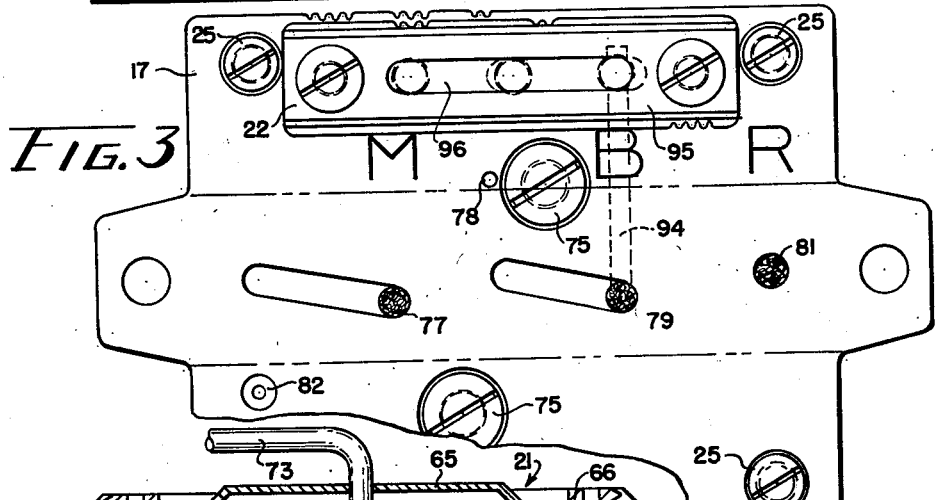
Figure 3 is a bottom view of the relay of Figure 1 with the connection block removed.
Figure 4:
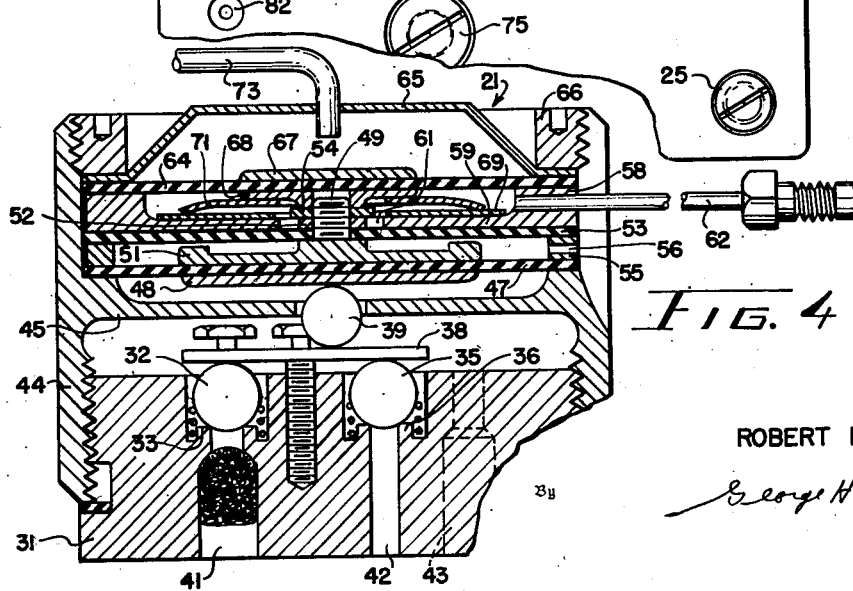
Figure 4 is a sectional view of the valve unit of the present relay.

The construction of relay 10 is best shown in Figures 2, 3 and 4, Figure 2 being taken on the line 2—2 of Figure 1, Figures 2 and 3 being enlarged to about twice full size and Figure 4 being about three times full size. Relay 10 comprises a base member 17, an enclosing cover 18, air flow restricters 19, a valve unit or assembly 21, a switching block 22 and a connection block 23. Cover 18 is attached to said base 17 by screws 25, a peripheral gasket 26 being interposed between the members to effect a sealing engagement and to render the enclosure air tight.

Valve unit 21 is the principal assembly in the present relay and includes a base portion 31 with supply and exhaust valves provided therein, the supply valve including ball valve member 32 engageable with a seat 33 and the exhaust valve comprising a ball valve member 35 engageable with a seat 36. In the neutral position both ball members are normally held on their seats against their springs by a warp plate 38 held in position by the two cap screws shown, by ball member 39 and by a bias spring, not shown. This valve arrangement is widely used in control devices and is shown in greater detail in Joesting Patent 2,354,814 and, while a valve structure of this sort has been found entirely satisfactory, any other supply and exhaust valve arrangement operable in the same sequence may be substituted. With the valve members 32 and 35 both against their seats and plate 38 in a neutral position, an increase in force by ball 39 causes plate 38 to rock about ball 35 and the bias spring, not shown, and permits ball 32 to be pushed off its seat by its spring. A lesser force by ball 39 causes plate 38 to rock about ball 32 and one of the cap screws, due to the bias spring, and permits ball 35 to be forced off its seat by its spring. Thus, an increase in force opens the supply valve, the exhaust valve remaining closed and a decrease in force results in the exhaust valve opening, the supply valve remaining closed, and both valves are closed when the force on the valve plate 38 is at a neutral value. A supply passage 41, an exhaust passage 42 and a branch passage 43 are formed in base portion 31, as shown in Figure 4.

A body portion 44 is screwed onto base portion 31 and includes a web 45 having a central hole in which ball 39 fits loosely, this web operating to hold ball 39 in its proper position. A flexible diaphragm 47 is seated on a shoulder in portion 44 and has reinforcing metal plate 48 cemented to its bottom side, and a somewhat similar plate 51 is cemented to its upper side, plate 51 having an upwardly projecting stud 49 extending through a second diaphragm 53. Diaphragm 53 is held in place by a nut 54 screwed down on stud 49 against a spacer washer 52 bearing against said diaphragm, and a suitable spacer ring 55 having an air vent hole 56 is located between the outer edges of diaphragms 47 and 53. Thus far, the space between diaphragm 47 and base portion 31 is considered a rebalancing chamber and the space between diaphragms 47 and 53 forms a reset chamber, passage 43 entering into the rebalancing chamber and passage 56 entering the reset chamber. A somewhat thicker spacer 58 is seated on top of diaphragm 53, this spacer having a flat web or partition member 59 with a central opening or hole 61 and also having attached thereto an air conduit 62. Web 59 thus masks off most of diaphragm 53, the portion of diaphragm 53 exposed by the hole serving as a seal-off diaphragm and the rest of the diaphragm being relatively inactive. A third or motor diaphragm 64 is seated on spacer 58 and is held in place by a motor chamber member 65 and a lock ring 66. Metal reinforcing plates 67 and 68 are cemented on opposite sides of diaphragm 64 and a shim 69 and a spring 71 are arranged between web member 59 and member 68. Member 68 includes a downwardly extending threaded portion screwed on stud 49, all three of the diaphragms thus being held together. The force exerted by spring 71 is preferably varied by varying the thickness of shim 69 but some adjustment may also be had by tightening or loosening member 68 on stud 49. An air conduit 73 is attached to the top of member 65 and communicates with the motor chamber defined by member 65 and diaphragm 64.

Valve unit 21 is attached to base member 17 by screws 75, with passages 41, 42 and 43 aligning with holes 77, 78 and 79 extending through said base member, a suitable gasket being used to prevent leakage. Tube 73 is attached to hole 81 in said base and tube 62 is connected to hole 82, holes 78 and 82 opening to the atmosphere and holes 77, 79 and 81 aligning with connection sockets 84, 85 and 86, respectively, in connection block 23, socket 84 being intended for the main air supply; socket 85 being used for the branch connection 15 to the device 12 being controlled, and socket 86 being used for the connection to the branch line 14 for controller 11.

Restrictors 19 are screwed into spaced holes 91, 92 and 93 which extend through said base member 17, restrictors 19 each comprising merely a hollow tube substantially filled with a stack of sintered stainless steel disks 94', said disks being in the nature of very fine screens. Hole 93 in said base member is connected to hole 79 by a bored passage 94 so that the branch line connection to device 12 also connects to the bottom of one of restrictors 19. The bottoms of holes 91, 92 and 93 are covered by an elongated, reversible switch plate 95 having a top and a bottom and having indicia marks on its two sides. The top side (assumed) has a groove 96 therein long enough to extend across all three holes 91, 92 and 93, and the bottom side has a shorter groove 97 long enough to cover holes 91 and 92 or 92 and 93 depending upon which side is turned outwardly, said groove 97 being closer to one end of plate 45 than the other. As shown, the indicia marks comprising two ribs on the plate 95 are in alignment with corresponding marks on base member 17 and groove 97 is covering holes 92 and 93, hence the branch opening 79 is connected through passage 94 and slot 97 to two restrictors 19 in parallel. If plate 95 now be turned end for end but not turned over, groove 97 will then cover holes 91 and 92 and the three rib indicia mark on plate 95 will align with the similar marks of 17. In this case, passage 94 will connect only with the restrictor screwed into hole 93 because the lower end of hole 93 will be blocked by plate 95. If plate 95 be turned over, then all three holes 91, 92 and 93 will be connected by groove 96, hence passage 94 will be in communication with all three restrictors in parallel. As restrictors 19 are similar and are about equal in air restriction, use of one restriction gives a maximum timing; two restrictors in parallel shorten the timing period, and three restrictors in parallel still further shorten said period.

Connection block 23 is merely a member having passages therethrough for matching with holes 77, 79 and 81 at one end and having tubing connection sockets 84, 85 and 86 in the other end, this block being used for ease in making the piping connections. Block 23 is attached to base member 17 by suitable screws or bolts, with a gasket 88 being used to prevent leakage.

Operation

Before discussing the operation of this apparatus, it may be assumed that the effective area of diaphragm 53 is about 10% of that of diaphragm 64 and the effective area of diaphragm 64 is about 6/7 of that of diaphragm 47. Further, spring 71 is adjusted so that the supply and exhaust valves are in neutral position (both closed) when the pressures in the motor chamber, the reset chamber and the rebalancing chamber are all at 7½ pounds per square inch. Under these conditions, the diaphragms are urged upwardly by the pressure in the reset chamber acting on the effective area of diaphragm 53 and by the valve springs and by springs 71 and they are urged downwardly by the 7½ pounds pressure in the motor chamber, diaphragm 47 having substantially no effect because of the equal pressure on both sides of the same. With relay 10 thus adjusted, controller 11 is adjusted so that it has 7½ branch pressure when at its set point. In practice, before the system is put in operation, relay 10 is by-passed and device 12 is controlled directly by controller 11 for a time, with the throttling range in controller 11 gradually being diminished until the system becomes unstable, the throttling range then being slightly widened to again render the system stable. Then relay 10 is connected into the system, as shown. For this example, it may be assumed that controller 11 has an 8° throttling range and the room temperature is at its set point.

If the temperature affecting controller 11 should now diminish, its branch line pressure will be proportionally increased and the pressure in the motor chamber of relay 10 will rise above its previous 7½ pound value. This forces the diaphragm assembly down and opens the supply valve, as before described, which permits air to flow into the rebalancing chamber of said unit. As the pressure in this chamber increases, diaphragm 47 exerts a force upwardly due to the difference in pressures on its two sides, thus tending to rebalance the added force exerted by the motor chamber. Obviously, as this pressure increases sufficiently to rebalance the relay unit, and move the diaphragm assembly back to a neutral position, the supply valve is closed. Meanwhile, the increased pressure in the rebalancing chamber has been imposed on motor 12 thus causing it to open further. Also, the higher pressure in the rebalancing chamber causes air to flow through passage 43, hole 79, passage 94, groove 97, the two restrictors 19 connected through groove 97 and into the spaced enclosed by housing 18, and from this space the higher pressure air flows through hole 56 into the reset chamber to thus tend to balance the increased pressure in the rebalancing chamber. However, due to the restrictors, the rate of flow into the reset chamber is quite slow and several minutes are required to appreciably increase the pressure in this chamber. As the pressure in the reset chamber increases, the rebalancing effect of the unit is diminished so that the excess pressure in the motor chamber again causes ball 39 to exert additional force on valve plate 38 to cause a further opening of the supply valve and thus further open valve 12 and cause a further pressure difference tending to cause air flow through the restrictors into the rest chamber. This process will continue indefinitely, unless thermostat 11 is satisfied, until the maximum pressure obtainable in the rebalancing chambers is reached. Thus, upon a decrease in the temperature at controller 11, a proportioning control is first exercised over valve 12 and then, as time elapses, the proportioning control of valve 12 gradually merges into floating control with the result that the valve will tend to be driven wide open unless the thermostat is in the meantime satisfied.

An increase in temperature in the space wherein controller 11 is located will have a similar but reverse effect, for the resulting decrease in space temperature will cause a decrease in pressure in the motor chamber of valve unit 21, thus resulting in less pressure through ball 39 on valve plate 38 and an opening of the exhaust valve, thereby diminishing the pressure in the rebalance chamber until it rebalances the pressure in the motor chamber. This causes a partial closing of valve 12 and at the same time causes a pressure difference to exist between the reset chamber and the rebalancing chamber, the air now flowing in a reverse direction to that previously described and tending to match the pressure in the rebalancing chamber. However, as this flow takes place, the effect of the pressure decrease in the rebalancing chamber is removed and the exhaust valve again opens, this action continuing until thermostat 11 is satisfied or until valve 12 is eventually driven entirely closed.

It was previously noted that diaphragm 64 has only 4/7 the effective area of diaphragm 47 hence, upon an initial deviation in temperature at controller 11, it is obvious that normal rebalancing cannot take place because a lesser pressure change in the rebalancing chamber is able to offset the pressure change in the motor chamber because of the difference in effective areas of the diaphragm. This tends to cause less proportioning control than would otherwise be effected by a given offset in temperature of the primary controller, the actual rebalancing resulting in about 4/7 as much change as would be the case in a normal proportioning control system. Thus, a sudden and large swing in the controller would cause a sudden motion in the control device but the amount of movement in the control device is limited to the aforementioned fraction of the change normally called for by the controller, thus the system tends to be stabilized to some extent by the lesser direct response that can be obtained from the control device. Stated in another way, because the diaphragm in the motor chamber is but 4/7 of the effective area of the diaphragm in the rebalancing chamber, about 1¾ times as much pressure change must take place in the motor chamber as will take place in the rebalancing chamber, thus broadening the throttling range of the controller and tending to stabilize the system in the same manner as would be effected by broadening the throttling range of the controller by mechanical adjustment.

In the previous discussion, it was pointed out that the seal-off diaphragm has an effective area about 10% as great as the effective area of the motor diaphragm and, because of the effective area of the seal-off diaphragm, a predetermined force was exerted by this diaphragm at the neutral or set point, this force assisting the spring 71 in opposing downward motion of diaphragm 64 of the motor chamber. Whatever the value of this force may be at the set point with 7½ pounds per square inch pressure in each of the chambers, it is obvious that the upward force exerted by diaphragm 53 will increase or decrease as the pressure in the reset chamber changes. As there is nothing to balance out this force except diaphragm 64, about 10% of the force exerted by diaphragm 64 is ineffective to operate the valve members but rather is used to oppose diaphragm 53. As the forces used for operating the valve members can be balanced out but the force used to oppose diaphragm 53 cannot be balanced out, this device is able to eliminate only 90% of the proportional system offset on droop. Thus, because the delayed floating system imposed by the present relay on a normal proportional control arrangement tends to wipe out the throttling range of the controller, with the exception of forces that cannot be balanced out, and as it appears that the variation in force caused by the seal-off diaphragm, amounts to about 10% of the force exerted by the pilot or motor diaphragm, the eventual control exercised by the present extends over only about 1/10 of the former throttling range, or in this case about .8 degree. While perfect control has not been achieved by use of this relay, it is obvious that the former throttling range has been very much decreased and, because the former throttling range was the smallest that could be used in a stable system under the previous arrangement, a considerable improvement has been effected.

While the normal effective area of diaphragm 53, the area exposed by opening 61 in member 59, is about 1/10 of that of diaphragm 64, a pressure on 64 great enough to cause a relatively large deflection of the diaphragms tends to cause diaphragm 53 to push away from member 59 and thus increase its effective area. As the pressure on the underside of diaphragm 53 is always above atmospheric pressure the increase in effective area of 53 results in an increased force opposing that exerted by diaphragm 64 and thus tends to stabilize the system.

We have then the case of a differential effect with effective area becoming greater for the greater movement. Greater movement causes surges of air and the increased effective area then helps to oppose these surges.

The amount of time delay proper for the superimposing of the floating control on the proportioning control varies with different systems hence, when the throttling range was first being adjusted and while relay 10 was being bypassed, the installer was also taking note of the time period of the cycling of the system and, having determined the cycling time of the system, an adjustment is made of switch block 95 to select a time delay slightly longer than the normal cycling period. The above described arrangement, with the restrictors now being used, gives reset timing of approximately 6, 9 or 18 minutes depending upon whether 3, 2 or 1 restrictor is used at a time.

Because many substitutions and equivalents will become apparent upon a study of the foregoing specification and drawings, the scope of this invention should be determined only by the appended claims.

I claim as my invention:

1. A relay device comprising a base member, a housing attached to said base to form a substantially air tight enclosure, a valve unit located within said enclosure and including supply and exhaust valve means and an operating member therefor, a flexible diaphragm arranged in said valve unit to form a rebalancing chamber, air passages into said chamber controlled by said valve means, said diaphragm being arranged to operate said operating member, a seal-off diaphragm arranged in spaced relation above said flexible diaphragm, said seal-off diaphragm and said flexible diaphragm defining a reset chamber, an air passage connecting said reset chamber to the space confined by said enclosure, a spring for urging said diaphragms upwardly, a pneumatic motor for urging said diaphragms downwardly, a conduit for connecting said motor to a suitable controller, a branch air conduit for connecting the said rebalancing chamber to a device to be controlled, a plurality of air restriction members attached to said base and opening into the space enclosed by said housing, an air passage from said branch conduit to a point adjacent one of said restriction members, and a switching block for connecting said last named air passage to two or more of said restriction members.

2. Control apparatus comprising a valve unit having a rebalancing chamber and a reset chamber divided by a flexible diaphragm, supply and exhaust valve means connected to said rebalancing chamber and arranged to be operated by said diaphragm, a seal-off diaphragm closing off the upper portion of said reset chamber, said seal-off diaphragm having a relatively small effective area, a pneumatic motor including a motor diaphragm spaced above said seal-off diaphragm, said motor diaphragm having an effective area less than that of the first named diaphragm, means connecting all of said diaphragms together for simultaneous motion, a spring arranged to oppose said pneumatic motor, an air tight enclosure for said valve unit and an air space, an air passage from said reset chamber to the space enclosed by said enclosure, and an air passage from said rebalancing chamber to said space, one of said passages including an air restriction.

3. Control apparatus comprising a valve unit having a rebalancing chamber and a reset chamber divided by a flexible diaphragm, supply and exhaust valve means connected to said rebalancing chamber and arranged to be operated by said diaphragm, a seal-off means closing off the upper portion of said reset chamber, a pneumatic motor spaced above said seal-off means, means connecting said motor to said flexible diaphragm, a spring arranged to oppose said motor, an airtight enclosure for said valve unit and an air space, an air passage from said reset chamber to the space enclosed by said enclosure, adjustable air flow restriction means, and an air passage from said rebalancing chamber to said space, one of said passages including said restriction means.

4. A control device comprising a valve unit having supply and exhaust valve means and including a first chamber, a second chamber and a third chamber; an air tight enclosure surrounding said valve unit, said enclosure having a base member, said base member including a plurality of connection means; air passages connecting said valve means, said first chamber and said third chamber to said connection means; an air passage connecting said second chamber to the space enclosed by said enclosure, a plurality of air restriction members opening within said space, an air passage connecting said first chamber to the first one of said restriction members; and air conduit means including an adjustable grooved member for connecting one or more of said restriction members in parallel with said first restriction member.

5. A control device comprising a valve unit having supply and exhaust valve means and including a rebalancing chamber, a reset chamber and a motor chamber; an air tight enclosure surrounding said valve unit, said enclosure having a base member; air passages connecting said valve means, said rebalancing chamber and said motor chamber to connection means attached to said base member; an air passage connecting said reset chamber to the space enclosed by said enclosure, a plurality of air restriction members opening within said space; and an air conduit means including an adjustable grooved block connecting said rebalancing chamber to one or more of said restriction members.

6. In a pneumatic reset relay, a valve unit comprising a base portion having supply and exhaust valve means therein, a flexible diaphragm mounted above said valve means and operably connected thereto, a second diaphragm spaced above said first normal diaphragm, a spacer including a partition having a relatively small central opening therein immediately above and in contact with said second diaphragm, means clamping the edge portions of said diaphragms to said unit, a pneumatic motor spaced above said second diaphragm and connected in operative relation therewith and to said flexible diaphragm and thereby connected in operative relation to said valve means, restricted air passage means from one side to the other of said flexible diaphragm, and a compression spring arranged between said partition member and said pneumatic motor.

7. Control apparatus comprising a valve unit having a rebalancing chamber and a reset chamber divided by a flexible diaphragm, supply and exhaust valve means connected to said rebalancing chamber and arranged to be operated by said diaphragm, a seal-off diaphragm closing off the upper portion of said reset chamber, said seal-off diaphragm being relatively large in diameter, a partition member having a relatively small central opening, said member being arranged above and in engagement with said seal-off diaphragm, said opening providing a relatively small effective area for said seal-off diaphragm, said effective area tending to increase slightly upon sufficient downward deflection of the seal-off diaphragm to cause it to move out of contact with said partition member around said opening, a pneumatic motor arranged above said seal-off diaphragm and arranged to exert force downwardly, a spring arranged to oppose said motor, means connecting said motor and said first flexible diaphragm in operative relation, and an air passage including flow restriction means connecting said rebalancing chamber and said reset chamber.

8. Control apparatus comprising a valve unit having a rebalancing chamber and a reset chamber divided by a flexible diaphragm, supply and exhaust valve means connected to said rebalancing chamber and arranged to be operated by said diaphragm, a seal-off diaphragm closing off the upper portion of said reset chamber, said seal-off diaphragm being relatively large in diameter, a partition member having a relatively small central opening, said member being arranged above and in engagement with said seal-off diaphragm, said opening providing a relatively small effective area for said seal-off diaphragm, said effective area tending to increase slightly upon sufficient downward deflection of the seal-off diaphragm as to cause it to move out of contact with said partition member around said opening, a pneumatic motor arranged above said seal-off diaphragm and arranged to exert force downwardly, a spring bearing against said partition member and arranged to oppose said motor, means connecting said motor and said first flexible diaphragm in operative relation, and an air passage and including air flow delay means connecting said rebalancing chamber and said reset chamber.

ROBERT P. ROETTER.

REFERENCES CITED

The following references are of record in the file of this patent:

UNITED STATES PATENTS

| Number | Name | Date |
| --- | --- | --- |
| 2,179,450 | Gorrie | Nov. 7, 1939 |
| 2,411,748 | Kelley | Nov. 26, 1946 |
| 2,432,705 | Williams | Dec. 16, 1947 |